April 28, 1959  G. M. STANDAL  2,884,031
WOODWORKING CHIPPING AND PLANING MACHINE WITH
CUTTER HEAD AND CUTTER BLADES THEREFOR
Filed Sept. 3, 1957  8 Sheets-Sheet 1

INVENTOR.
George M. Standal
BY
Stubwells
Atty.

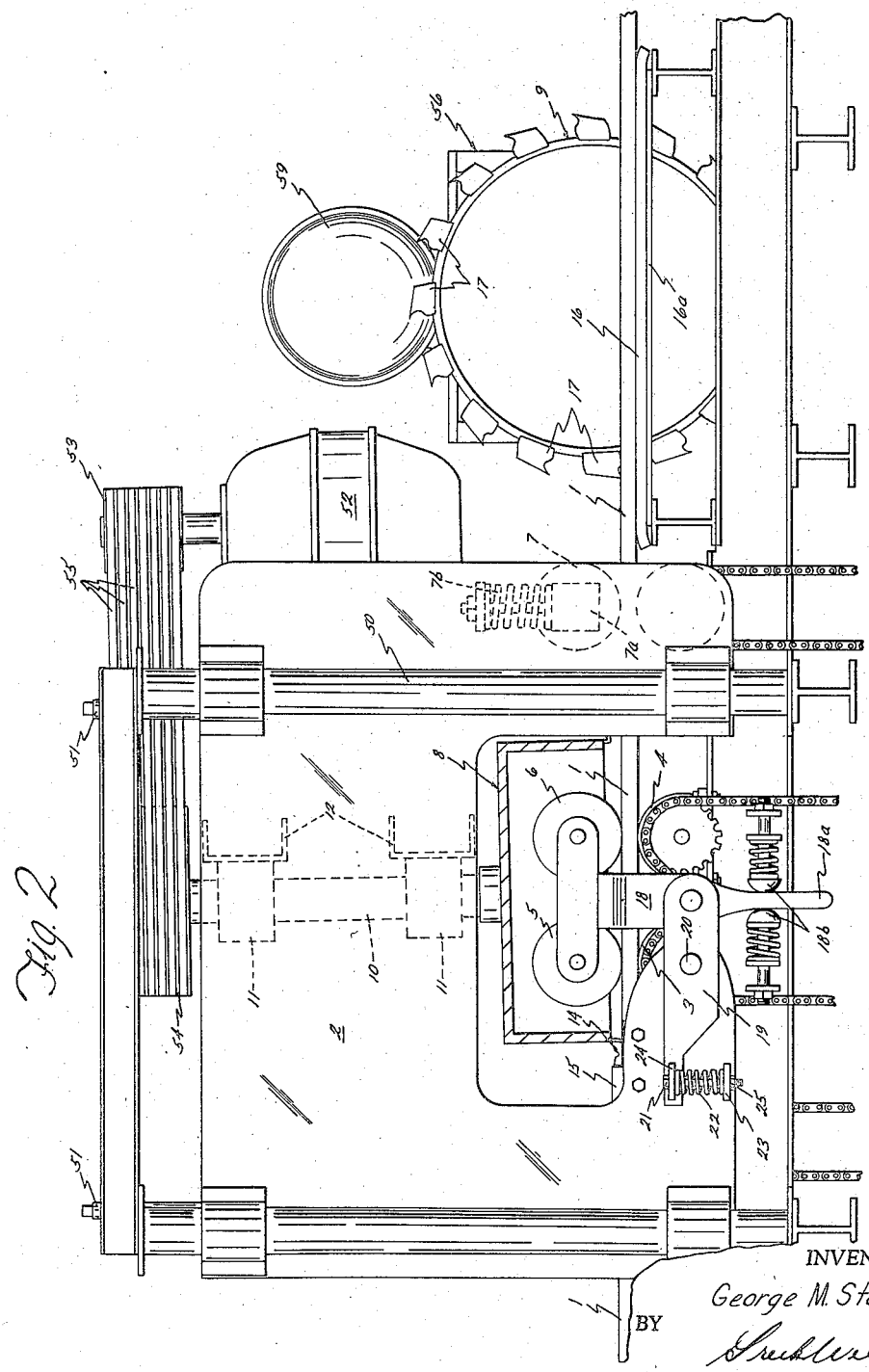

April 28, 1959   G. M. STANDAL   2,884,031
WOODWORKING CHIPPING AND PLANING MACHINE WITH
CUTTER HEAD AND CUTTER BLADES THEREFOR
Filed Sept. 3, 1957   8 Sheets-Sheet 3
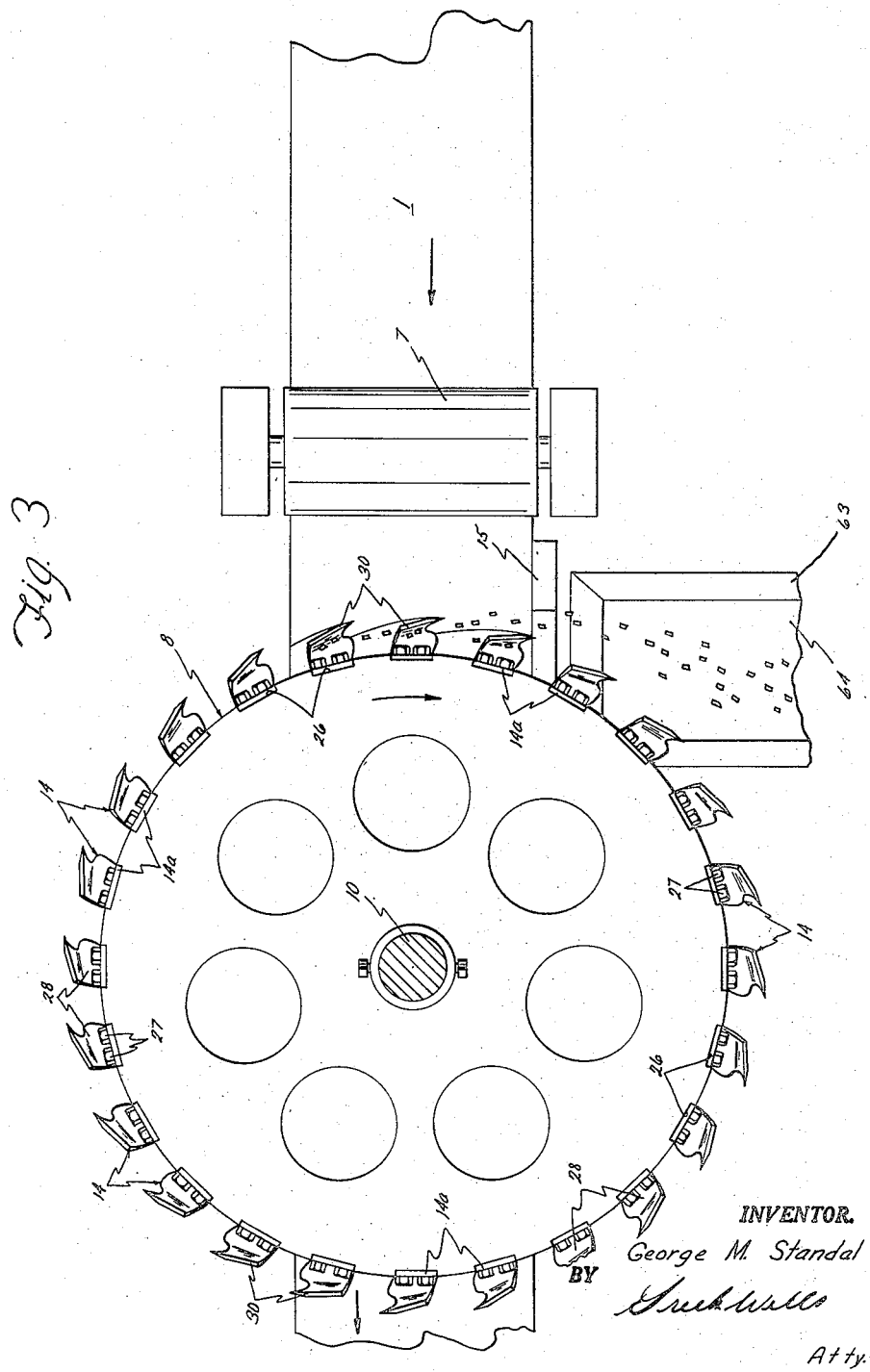
INVENTOR.
George M. Standal
BY
Atty.

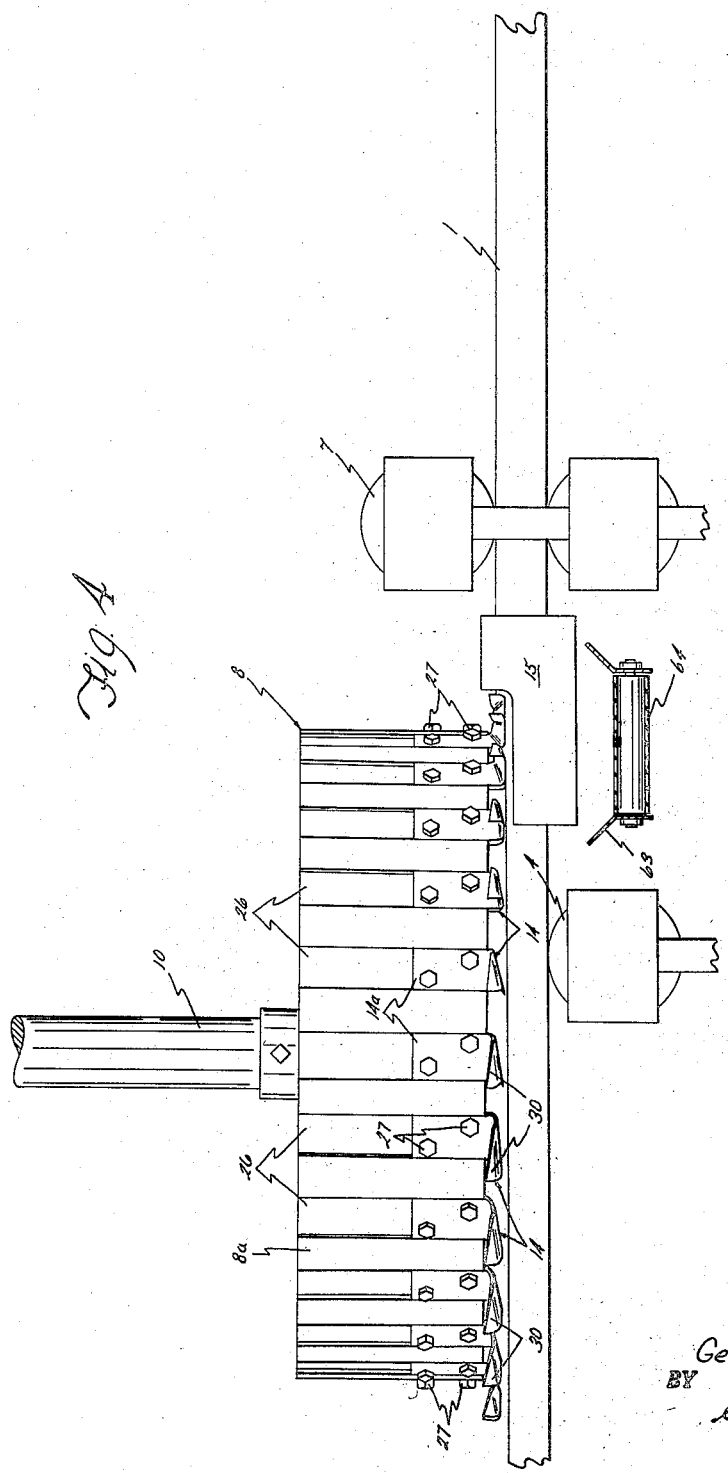

April 28, 1959 G. M. STANDAL 2,884,031
WOODWORKING CHIPPING AND PLANING MACHINE WITH
CUTTER HEAD AND CUTTER BLADES THEREFOR
Filed Sept. 3, 1957 8 Sheets-Sheet 5
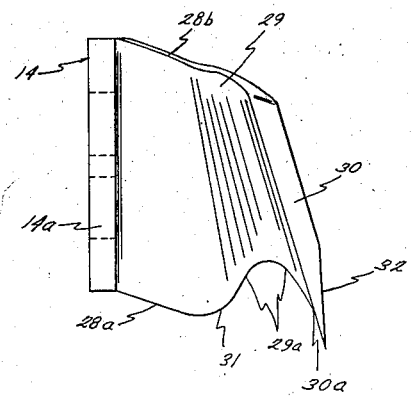
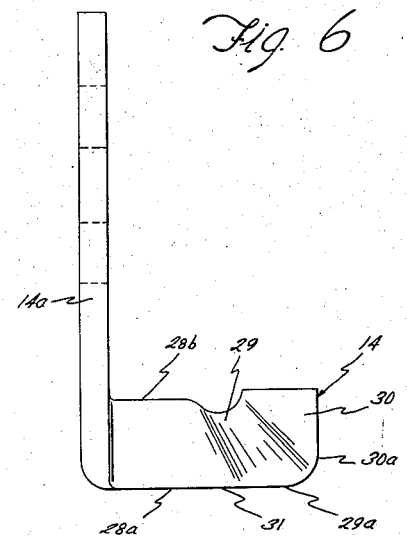
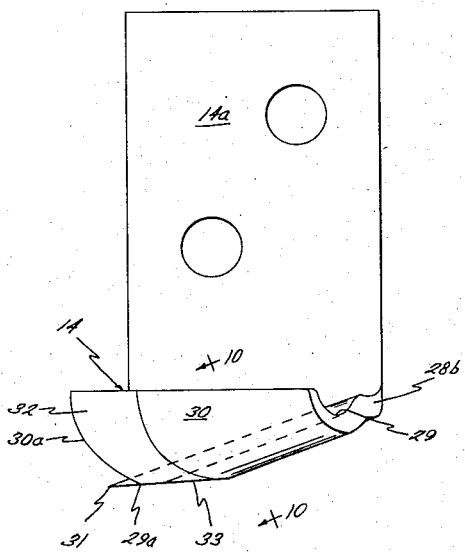
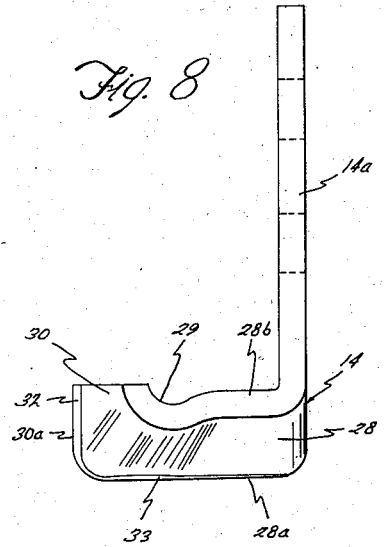
INVENTOR.
George M. Standal
BY
Atty.

April 28, 1959 G. M. STANDAL 2,884,031
WOODWORKING CHIPPING AND PLANING MACHINE WITH
CUTTER HEAD AND CUTTER BLADES THEREFOR
Filed Sept. 3, 1957 8 Sheets-Sheet 6
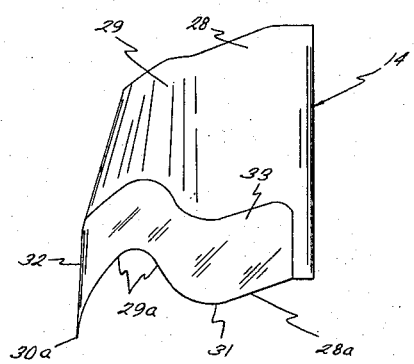
Fig. 9
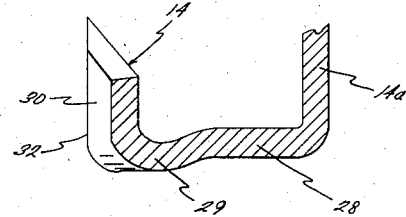
Fig. 10
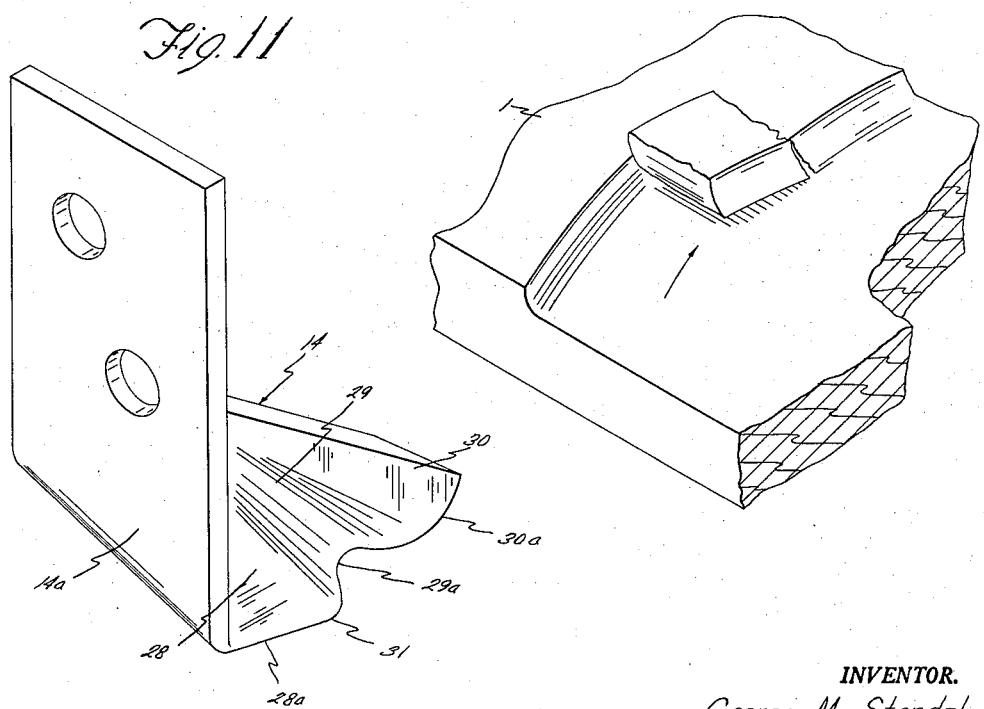
Fig. 11
Fig. 12
INVENTOR.
George M. Standal
BY
Atty.

April 28, 1959 G. M. STANDAL 2,884,031
WOODWORKING CHIPPING AND PLANING MACHINE WITH
CUTTER HEAD AND CUTTER BLADES THEREFOR
Filed Sept. 3, 1957 8 Sheets-Sheet 7
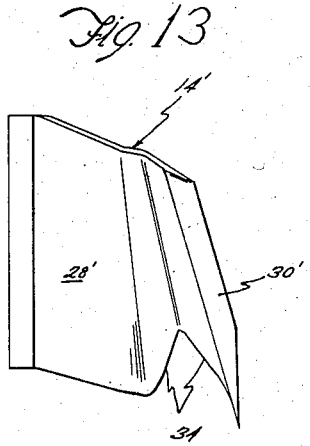
Fig. 13
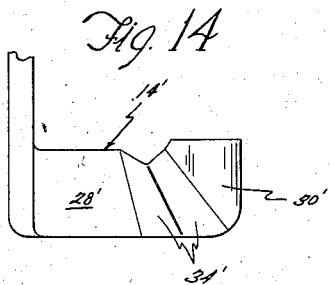
Fig. 14
Fig. 15
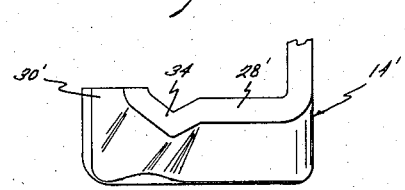
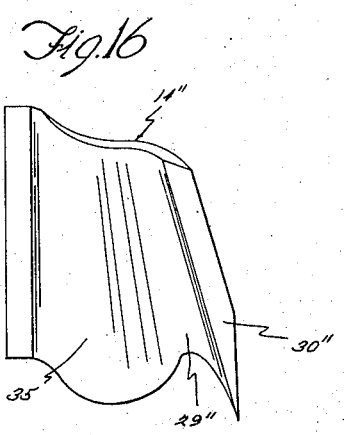
Fig. 16
Fig. 17
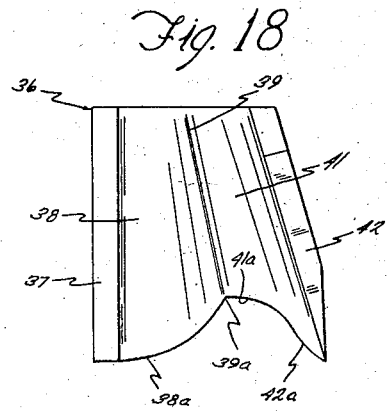
Fig. 18
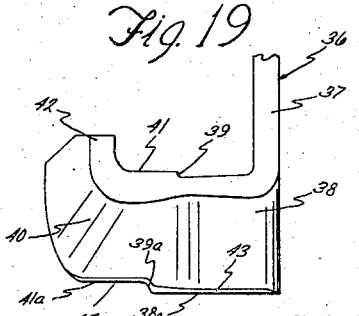
Fig. 19
INVENTOR.
George M. Standal
BY
Atty.

April 28, 1959  G. M. STANDAL  2,884,031
WOODWORKING CHIPPING AND PLANING MACHINE WITH
CUTTER HEAD AND CUTTER BLADES THEREFOR
Filed Sept. 3, 1957  8 Sheets-Sheet 8
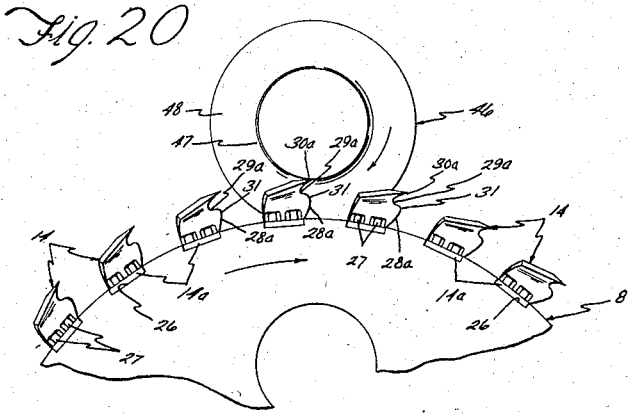
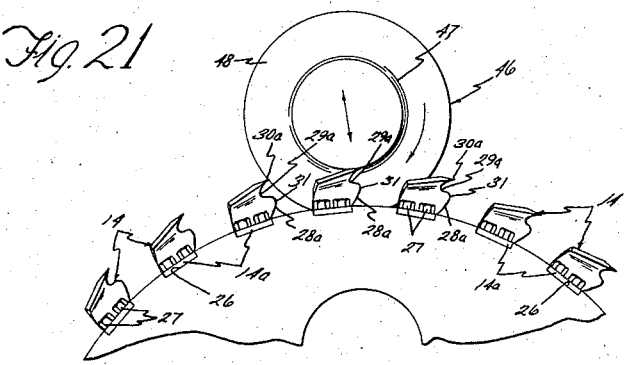
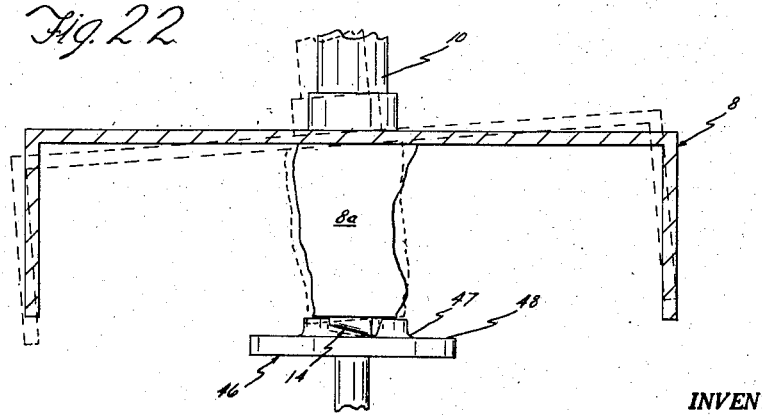
INVENTOR.
George M. Standal
BY
Atty.

United States Patent Office

2,884,031
Patented Apr. 28, 1959

2,884,031

WOODWORKING CHIPPING AND PLANING MACHINE WITH CUTTER HEAD AND CUTTER BLADES THEREFOR

George M. Standal, Chemainus, British Columbia, Canada

Application September 3, 1957, Serial No. 681,801

13 Claims. (Cl. 144—114)

My invention relates to planers for chipping off the surplus wood from boards that are to be given a smooth surface. The purpose of my invention is to provide a machine which will take off the surplus wood in chip form by cutting the surplus wood across the grain with a shearing action.

In finishing boards to give them a smooth surface it is common to use planers that move lengthwise of the board to take off thin shavings. When a board is to be given a smooth surface it is necessary to remove the wood at the surface to a depth to substantially eliminate the unevenness and broken grain wood that results from the sawing. Therefore it is customary to remove a substantial thickness. My invention is directed to a machine which will make this initial removal by cutting across the board transversely to its length with a shearing action which does not tear up the grain of the wood. More particularly it is the purpose of my invention to provide a new cutter which slices the wood crosswise of the board and avoids tearing up the grain to any appreciable extent where the grain is crooked or distorted as around knots.

My invention is embodied in a machine which utilizes a multiplicity of cutters that are mounted upon a rotating head which rotates on an axis that is substantially perpendicular to the surface of the board being planed. The axis of rotation of the head is given a slight angle to the perpendicular so that the cutter which first strikes the board will not again strike it at the back side of the head. The board is forced past the cutter head by feed rolls which are synchronized with the rotation of the cutter head to determine the length of cut that will be made by each tooth. The machine utilizes anvils at the edge of the board toward which the working cutters are moving so that the board is held firmly against the force of the cutters. The machine also embodies presser rolls in advance of and behind the working cutters to maintain the path of the board as it moves beneath the cutter head. The cutters serve to remove the cut chips and throw them out to a hopper which is provided with a conveyor beneath its bottom outlet to carry the chips away.

The nature and advantages of my invention will appear more fully from the following description and the accompanying drawings wherein a preferred form of the invention is illustrated. The drawings and description, however, are illustrative only and are not intended to limit the invention except insofar as it is limited by the claims.

In the drawings:

Figure 2 is a side view taken substantially on the line 2—2 of Figure 1, with certain parts broken away;

Figure 3 is an enlarged diagrammatic view looking down on the cutter head and a board passing through the machine;

Figure 4 is a side view looking at Figure 3 from the right hand side;

Figure 5 is a plan view of a cutter;

Figure 6 is a front view of the cutter;

Figure 7 is a side view of the cutter looking at Figure 6 from the right hand side;

Figure 8 is a rear view of the cutter;

Figure 9 is a bottom view of the cutter;

Figure 10 is a fragmentary sectional view taken on the line 10—10 of Figure 7;

Figure 11 is a perspective view of the cutter illustrating the contour of the cutting edge;

Figure 12 is a fragmentary perspective view of a piece of board illustrating the cut made by the cutter;

Figure 13 is a plan view of a modified cutter;

Figure 14 is a front view of the cutter shown in Figure 13;

Figure 15 is a rear view of the cutter shown in Figure 13;

Figure 16 is a plan view of another form of cutter;

Figure 17 is a rear view of the cutter shown in Figure 16;

Figure 18 is a plan view of another form of cutter;

Figure 19 is a rear view of the cutter shown in Figure 18;

Figure 20 is a fragmentary plan view of a cutting head and the grinding wheel therefor;

Figure 21 is a view like Figure 20, showing the grinder position changed to grind the feed clearance for the cutter; and Figure 22 is a fragmentary sectional view illustrating the effect of tipping the grinder with respect to the cutter head.

Figure 1:
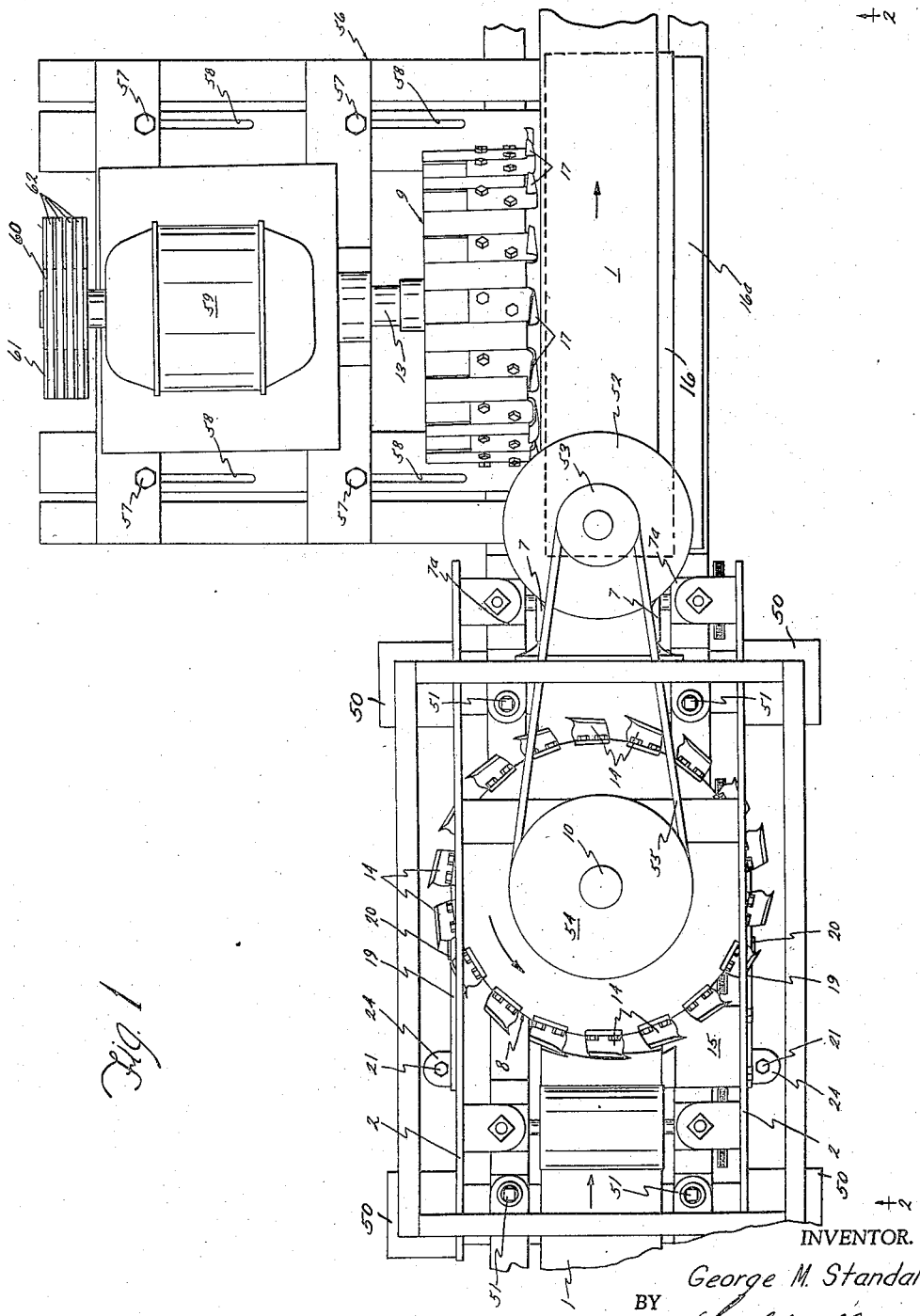
Figure 1 is a somewhat diagrammatic plan view of a machine embodying my invention.

My invention as illustrated in Figures 1 and 2, is embodied in a machine which is adapted to convey a board 1 along a definite path across the frame parts of the machine, by using feed rollers 3 and 4 and presser rollers 5, 6 and 7 to hold the board against the feed rollers 3 and 4. As illustrated in Figures 1 and 2, the top surface of the board 1 and a side edge of the board 1 are being trimmed simultaneously by cutter heads 8 and 9. The cutter head 8 operates on the top surface of the board and the cutter head 9 trims the side edge of the board. The cutter head 8 is rotated by a drive shaft 10 mounted in suitable bearings 11 on the machine frame parts 12. A shaft 13 drives the cutter head 9. In order to hold the board against movement away from the cutters 14 on the cutter head 8, an anvil 15 is mounted on the frame side plates 2 to engage the side edge of the board toward which the cutters tend to force the board. An anvil 16 is likewise provided on a bed plate 16a to oppose the force of the cutters 17 on the head 9.

As illustrated best by Figure 2, the rollers 5 and 6 operate beneath the cutter head 8 and are spring pressed downwardly by means of a yoke 18 that carries the rollers 5 and 6, arms 19 pivoted on the side plates 2 at 20, stems 21, springs 22 which are under compression between blocks 23 on the side plates and stops 24 on the arms 19. The stem 21 is shown as a bolt which is threaded to receive a nut 25 so that the nut can be moved up and down to vary the pressure of the rollers 5 and 6 against the board 1. The yoke 18 is yieldingly held by depending ends 18a of the yoke 18 and spring pressed guides 18b so that the rollers 5 and 6 can yield over high spots on a board as it passes under them. The roller 7 is spring pressed downwardly by springs 7b pressing on the bearing blocks 7a of the roller 7. The mounting of the head 8 in its bearing is such that the axis of rotation of the head is substantially perpendicular to the top surface of the board passing over the feed rollers. However, in order to insure clearance of the board beneath the cutters as the board leaves the feed rollers 3, the axis of the cutter head 8 may be inclined slightly to the perpendicular so that the pressure rollers 5 and 6 will keep the board 1 from contacting the cutters after it has been trimmed.

The side plates 2 and the parts carried thereby including the cutter head 8, have to be adjusted up and down to accommodate various board thicknesses. Four posts 50 guide the side plates 2 vertically and lifting screws 51 are used to make the vertical adjustment. The drive of the head 8 is from a motor 52 through pulleys 53 and 54 and belts 55 to the drive shaft 10.

The cutter head 9 has its drive shaft 13 supported on a sub frame 56 that is adjustable transversely of the main frame of the machine and is held in place by bolts 57 in slots 58. The shaft 13 is driven from a motor 59 on the sub frame 56 through pulleys 60 and 61 and belts 62.

Having described in general the structure of the machine, I now refer to the cutters 14 and 17 which are secured on the heads 8 and 9 in substantially the same fashion. Figures 3 and 4 show the head 8 as being provided with peripheral slots 26 in its skirts 8a. These slots provide guides for shanks 14a of the cutters 14 and the cutters are held in position by screws 27 that are threaded into the skirt 8a. The cutters 17 on the head 9 are mounted in the same fashion. The cutters, as illustrated in detail in Figures 5 to 11, comprise a base portion 28 that is angularly disposed with respect to the shank 14a, and which extends outwardly and upwardly from the shank 14a, but makes an angle upwardly from the advancing edge 28a to the rear edge 28b of 25 to 35 degrees with respect to a plane perpendicular to the axis of the head 8 on which the cutter is mounted. The cutter actually works better with a lesser angle but in order to have sufficient strength in the cutter edge, the angle must be increased for weaker steel.

Outwardly from the portion 28 of the cutter 14, the cutter 14 is curved down or depressed as indicated at 29 and is then turned upwardly to provide a nose portion 30 that extends substantially above the portion 28. The depression 29 and the nose 30 are not parallel to the shank 14a but approach the shank 14a from their front ends to their rear ends. The bottom faces of portions 28 and 29, that is, the faces toward the board, are ground off flat to sharpen the advancing edge 28a and form the advancing edge 29a into a concave cutting edge, the outer tip of which joins the advancing edge 30a of the nose 30. The nose 30 is ground off on its outer surface to sharpen its advancing edge 30a. The slight upward angle of the portion 28 with respect to a plane perpendicular to the shank 14a causes the edge 28a to advance, with respect to a radial line from the axis of the cutter through the front edge of shank 14a, outwardly from the shank 14a, where the down curve from 28 to 29 occurs. The advancing edge of the cutter curves back and crosses the radial line to provide a convex cutting edge portion 31 between the straight edge 28a and the concave edge 29a. The advancing edge as it extends up the outer section of the depression 29 advances again with respect to the radial line to bring the cutting edge portion 30a in front of the radial line.

The cutting edges just described place the tip portion 30a ahead most at the top, so that in cutting across the wood the fibers are first severed at the top of the board and the edge 31 is next to engage. The wood is sliced progressively from these two places to the rearmost portions of the edges 29a and 28a. This particular slicing action minimizes the splitting of the wood along grain lines.

The chips removed by the cutters are lifted and thrown forward by the inclined top surface into a hopper 63 at the side of the machine for delivery upon a conveyor 64. The cutters 17 on the head 9, which trim the edge of the board 1, are the same in construction as the cutters 14. The speeds of the heads 8 and 9 are synchronized with the speed at which the board 1 is fed through the machine so that each cutter will slice off a chip of a certain length. For a certain speed of advance of the board a cutter head having a given spacing of teeth will cut chips of a given length.

For example, if a board is advancing at 600 feet a minute and it is desired to cut one inch slices from the board by each cutter, then the board must advance that far between the time one cutter enters the wood and the time the next cutter enters the wood. With 18 teeth as shown in Figure 1, and a diameter of cutter head from the tip of one cutter to the tip of a cutter directly opposite about 35 inches, the cutting edges would be spaced about 6 inches apart around the cutter head. To move ahead one inch on the board at 600 feet a minute takes $\frac{1}{120}$ second. The cutter head would have to present one cutter to each inch of board or all its cutters in $\frac{18}{120}$ second. This would require the cutter head to turn at 400 r.p.m. Higher speeds of boards would require higher cutter speeds for the same length slice from the board.

The advancing face of the nose portion 30 of the cutter 14 must have a "lead" angle great enough to accommodate the board travel. This lead angle is illustrated best in Figures 5 and 8 where the surface 32 is so ground as to give the necessary back clearance. It is also necessary to provide a very slight back clearance on the bottom face of the cutter 14 behind the cutting edges. This clearance is illustrated at 33 in Figures 7 and 8 of the drawings. The back clearances on the surfaces 32 and 33 are of the order of a few degrees. For example, with the board travel and cutter speed referred to before, if the surface 32 extends one-half inch back from the edge 30a, the rear edge of the surface 32 must be cut back more than one-twelfth inch to accommodate the board advance. Otherwise the rear edge of the surface 32 would oppose advance of the board. The clearance of the surface 33 is much less. It is only needed to offset the wear of the advancing edges.

It is believed to be evident from the foregoing description that the cutter 14 provides a means for slicing a series of layers from a board as it passes a cutter head that carries a series of the cutters in the manner previously described. Except at the nose 30 of the cutter 14, the cutting action is substantially in a plane leaving the board surface finished smooth enough for sanding. The chips removed are as illustrated in Figure 3, of a good size to use as raw material for paper pulp without further treatment. The slicing action of the cutters rotating across the grain of the wood on an upright axis with respect to the surface planed, avoids splitting along the grain, even around knots where the grain is usually curved. The nose 30, in combination with the upward incline of the cutter toward the rear of the cutter and the inward sweep of the nose portion 30 from front to back of the cutter, serves to throw the chips out from the cutter head so they can drop into a hopper and be conveyed away without using suction devices to keep the cutters clear.

The cutter 14 may be varied in shape and still retain the essential slicing edges as is illustrated by the modifications in Figures 13 to 19 inclusive. These modifications embody the features that provide the slicing action of the cutter and the parts that cooperate to lift and discharge the chips. In Figures 13 to 15, the portion 34 of the cutter 14' is made V-shaped instead of curved as the part 29 in the main form of the cutter. The portions 28' and 30' are essentially the same as in the main form of the cutter. In Figures 16 and 17, an upwardly bowed portion 35 on the cutter 14'' is used instead of the portion 28 of the main form of the cutter 14. The portions 29'' and 30'' are the same as in the main form of the cutter 14. In Figures 18 and 19, the cutter 36 is made into a two stage cutter to take off two separate chips for each slice of a cutter across the board. The cutter 36 has an upwardly bowed portion 38 extending laterally from the shank 37. At the outer, lowest extremity of the bowed portion 38, a sharply upwardly and outwardly inclined ledge 39 is provided on the top surface of the cutter 36 and the bottom surface is rounded as indicated at 40. Outwardly of the ledge 39, the top surface 41 is substantially straight but inclined upward slightly to a nose 42 which is curved upwardly as in the main form of the invention. In grinding the clearance faces of the cutter 36, the surface 43 is flat with a slight rearward rise providing a convex forward edge 38a. Outwardly beneath the surface 41, a clearance surface 45 is ground which is flat but raised above the level of the surface 43. With this construction the advancing edges 38a and 39a, 41a and 42a cut two slices from the board each time a cutter 36 passes over it. This cutter 36 is desirable where the chips should be of less thickness than the total thickness to be cut from the board. The relative distances across the edges 38a and 41a determine the lengths of the chips.

In Figures 20, 21 and 22, I have illustrated roughly how the cutters are kept sharp. A grinding wheel 46 is provided with a rounded surface at 47 to grind the edge 30a of the nose 30, and a flat surface 48 to grind the edges 28a, 29a and 31. The cutter head 8 is rotated past the grinding wheel 46 so that all cutters are sharpened alike. To regrind the clearance surfaces 32, the grinding wheel is moved angularly as indicated in Figure 21, while the cutter 14 is moved slowly across the grinding wheel. To regrind the bottom clearance surfaces 33, the cutter head is tilted slightly with respect to the plane of the surface 48 of the grinding wheel, as illustrated in Figure 22 and each cutter is thus reground to provide the desired clearance surface 33. In this way the cutters can be sharpened and kept in first class condition without removing them from their respective cutter heads.

It is believed that the nature of my invention will be clear from the foregoing description.

Having thus described my invention, I claim:

1. In a planer having means to pass boards across a cutter head, a cutter head, a shaft rotating said cutter head upon an axis upright to the board surface to be planed, a plurality of cutters mounted on the cutter head and having cutting edges all in a common plane perpendicular to the said axis, the cutters also having noses curving away from the said plane and provided with cutting edges merging with the first named cutting edges.

2. In a planer having means to pass boards across a cutter head, a cutter head, a shaft rotating said cutter head upon an axis upright to the board surface to be planed, a plurality of cutters mounted on the cutter head and having cutting edges all in a common plane perpendicular to the said axis, the cutters also having noses curving away from the said plane and provided with cutting edges merging with the first named cutting edges, and the cutting edges in said plane being inclined to a radial line through the cutter head axis.

3. In a planer having means to pass boards across a cutter head, a cutter head, a shaft rotating said cutter head upon an axis upright to the board surface to be planed, a plurality of cutters mounted on the cutter head and having cutting edges lying substantially in a common plane perpendicular to the said axis, the said cutting edges of each cutter being curved in said plane, the cutters also having noses curving away from the said plane and provided with cutting edges merging with the first named cutting edges.

4. In a planer having means to pass boards across a cutter head, a cutter head, a shaft rotating said cutter head upon an axis upright to the board surface to be planed, a cutter on said head having a cutting edge lying substantially in a plane perpendicular to said axis, said cutter having an upcurved nose portion provided with a cutting edge merging with the first named cutting edge, the cutter having a top surface inclined upwardly away from the board surface from the cutting edge rearwardly.

5. In a planer having means to pass boards across a cutter head, a cutter head, a shaft rotating said cutter head upon an axis upright to the board surface to be planed, a cutter on said head having a cutting edge lying substantially in a plane perpendicular to said axis, said cutter having an upcurved nose portion provided with a cutting edge merging with the first named cutting edge, said nose portion being inclined toward said axis from its cutting edge rearwardly.

6. In a planer having means to pass boards across a cutter head, a cutter head, a shaft rotating said cutter head upon an axis upright to the board surface to be planed, a cutter on said head having a cutting edge lying substantially in a plane perpendicular to said axis, said cutter having an upcurved nose portion provided with a cutting edge merging with the first named cutting edge, the cutter having a top surface inclined upwardly away from the board surface from the cutting edge rearwardly, said cutter being bowed down between the nose and the head from front to rear.

7. In a planer having means to pass boards across a cutter head, a cutter head, a shaft rotating said cutter head upon an axis upright to the board surface to be planed, a cutter on said head having a cutting edge lying substantially in a plane perpendicular to said axis, said cutter having an upcurved nose portion provided with a cutting edge merging with the first named cutting edge, the first named cutting edge being curved in said plane.

8. In a planer having means to guide boards endwise along a definite path, the improvement comprising a cutter head having a central drive shaft substantially vertical to said path and a cutter mounting portion carried by the shaft having means to mount a plurality of cutters at equal distances radially from said shaft, cutters mounted on said means and extending radially outward, said cutters having front cutting edges lying in a common plane perpendicular to said shaft, said cutters also having upturned nose portions at their outer ends provided with front cutting edges ahead of the adjacent portions of the front cutting edges lying in said common plane.

9. In a planer having means to guide boards endwise along a definite path, the improvement comprising a cutter head having a central drive shaft substantially vertical to said path and a cutter mounting portion carried by the shaft having means to mount a plurality of cutters at equal distances radially from said shaft, cutters mounted on said means and extending radially outward, said cutters having front cutting edges lying in a common plane perpendicular to said shaft, said cutters also having upturned nose portions at their outer ends provided with front cutting edges ahead of the adjacent portions of the front cutting edges lying in said common plane, said last named front cutting edges being curved in said common plane.

10. In a planer having supporting and feeding means operable to support and feed boards endwise, a cutter head over said means having a central upright drive shaft, a depending skirt supported on said shaft, a plurality of cutters mounted on said skirt at equal distances from the axis of said shaft, said cutters having front cutting edges lying in a common plane perpendicular to said shaft, and upturned nose portions provided with front cutting edges, and means within said skirt beneath said shaft, operating to bear on the planed surface of the boards and hold the boards down upon said supporting and feeding means as they pass beneath the cutter head.

11. In a planer having supporting and feeding means operable to support and feed boards endwise, a cutter head over said means having a central upright drive shaft, a depending skirt supported on said shaft, a plurality of cutters mounted on said skirt at equal distances from the axis of said shaft, said cutters having front cutting edges lying in a common plane perpendicular to said shaft, and upturned nose portions provided with front cutting edges, roller means within said skirt bearing on the planed surface of a board being planed by the cutters, and an anvil adjacent to the head supporting the boards against lateral movement by the cutters.

12. In a planer having supporting and feeding means operable to support and feed boards endwise, a cutter head over said means having a central upright drive shaft, a depending skirt supported on said shaft, a plurality of cutters mounted on said skirt at equal distances from the axis of said shaft, said cutters having front cutting edges lying in a common plane perpendicular to said shaft, and upturned nose portions provided with front cutting edges, and means within said skirt beneath said shaft, operating to bear on the planed surface of the boards and hold the boards down upon said supporting and feeding means as they pass beneath the cutter head, said means within the skirt comprising a pair of spaced apart rollers and means yieldingly opposing upward movement of the rollers.

13. In a planer having supporting and feeding means operable to support and feed boards endwise, a cutter head over said means having a central upright drive shaft, a depending skirt supported on said shaft, a plurality of cutters mounted on said skirt at equal distances from the axis of said shaft, said cutters having front cutting edges lying in a common plane perpendicular to said shaft, and upturned nose portions provided with front cutting edges, and means within said skirt beneath said shaft, operating to bear on the planed surface of the boards and hold the boards down upon said supporting and feeding means as they pass beneath the cutter head, said supporting and feeding means including an anvil beneath the skirt having an upright face against which the cutters urge a board being planed.

References Cited in the file of this patent

UNITED STATES PATENTS

| | | |
|---|---|---|
| 1,015,927 | Arbuthnot | Jan. 30, 1912 |
| 1,062,634 | Buckhart | May 27, 1913 |
| 1,576,676 | Ruble | Mar. 16, 1926 |
| 2,192,522 | Misuraca | Mar. 5, 1940 |
| 2,549,631 | Norquist | Apr. 17, 1951 |
| 2,675,034 | Ledding et al. | Apr. 13, 1954 |
| 2,696,856 | McCoy | Dec. 14, 1954 |
| 2,792,036 | Buttke | May 14, 1957 |
| 2,811,183 | Mottet | Oct. 29, 1957 |

FOREIGN PATENTS

| | | |
|---|---|---|
| 889,833 | Germany | Sept. 14, 1953 |
| 929,991 | Germany | July 7, 1955 |